United States Patent
Tsumori et al.

(10) Patent No.: US 7,931,410 B2
(45) Date of Patent: Apr. 26, 2011

(54) MACHINED CAGE FOR CYLINDRICAL ROLLER BEARING AND METHOD OF MANUFACTURING THE SAME

(75) Inventors: Yukihisa Tsumori, Mie (JP); Takuya Ozu, Mie (JP)

(73) Assignee: NTN Corporation, Osaka-shi (JP)

(*) Notice: Subject to any disclaimer, the term of this patent is extended or adjusted under 35 U.S.C. 154(b) by 876 days.

(21) Appl. No.: 11/661,941

(22) PCT Filed: Oct. 11, 2005

(86) PCT No.: PCT/JP2005/018705
§ 371 (c)(1),
(2), (4) Date: Aug. 20, 2007

(87) PCT Pub. No.: WO2006/043444
PCT Pub. Date: Apr. 27, 2006

(65) Prior Publication Data
US 2008/0118198 A1    May 22, 2008

(30) Foreign Application Priority Data

Oct. 22, 2004  (JP) ................... 2004-308426
Dec. 9, 2004   (JP) ................... 2004-356979

(51) Int. Cl.
*F16C 33/48* (2006.01)
(52) U.S. Cl. ..................................... 384/572
(58) Field of Classification Search ............. 384/572, 384/573, 574, 576, 577, 578, 579, 580, 581, 384/582
See application file for complete search history.

(56) References Cited

U.S. PATENT DOCUMENTS

| | | | |
|---|---|---|---|
| 4,403,813 A * | 9/1983 | Schaefer | 384/450 |
| 6,599,019 B2 * | 7/2003 | Matsui et al. | 384/450 |
| 6,955,476 B1 | 10/2005 | Murai | |
| 2003/0068110 A1 | 4/2003 | Matsui et al. | |

FOREIGN PATENT DOCUMENTS

| | | |
|---|---|---|
| DE | 100 21 089 | 2/2001 |
| EP | 1 233 199 | 8/2002 |
| JP | 05-012753 | 10/1993 |

(Continued)

OTHER PUBLICATIONS

Japanese Office Action (and English translation thereof) issued Jul. 16, 2010 in Japanese Application No. 2004-308426 which is a foreign counterpart of the present application.

(Continued)

*Primary Examiner* — Thomas R Hannon
*Assistant Examiner* — Phillip A Johnson
(74) *Attorney, Agent, or Firm* — Wenderoth, Lind & Ponack, L.L.P.

(57) ABSTRACT

A strength of a machined cage for a cylindrical roller bearing is increased without reducing a bearing life. An integral machined cage for a cylindrical roller bearing includes: a pair of side plates (42, 44); a plurality of columns (46), which are arranged in a circumferential direction, for connecting the pair of side plates (42, 44); pockets (48) formed between the adjacent columns (46); and relief portions (50) provided at four corners of each of the pockets (48), in which as viewed from a section perpendicular to an axis of the cage, the columns (46) have side surfaces each constituting a circular arc shape, and the relief portions (50) are in parallel to the side surfaces of the columns (46).

2 Claims, 10 Drawing Sheets

FOREIGN PATENT DOCUMENTS

| | | |
|---|---|---|
| JP | 09-177793 | 7/1997 |
| JP | 11-51060 | 2/1999 |
| JP | 11-51061 | 2/1999 |
| JP | 11-218135 | 8/1999 |
| JP | 2001-012477 | 1/2001 |
| JP | 2001-191214 | 7/2001 |
| JP | 2001-330036 | 11/2001 |
| JP | 2002-147464 | 5/2002 |
| JP | 2003-214439 | 7/2003 |
| JP | 2004-144244 | 5/2004 |
| JP | 2006-138379 | 6/2006 |
| JP | 2006-138380 | 6/2006 |
| JP | 2006-138381 | 6/2006 |

OTHER PUBLICATIONS

Japanese Office Action (and English translation thereof) issued Jul. 16, 2010 in Japanese Application No. 2004-356979 which is a foreign counterpart of the present application.

Japanese Office Action (along with partial English translation) issued Oct. 13, 2010 in Application No. 2004-356979.

Supplementary European Search Report issued Nov. 22, 2010 in corresponding European Application No. 05 79 3122.

* cited by examiner

FIG. 14 PRIOR ART

MACHINED CAGE FOR CYLINDRICAL ROLLER BEARING AND METHOD OF MANUFACTURING THE SAME

TECHNICAL FIELD

The present invention relates to an integral machined cage for a cylindrical roller bearing and a method of manufacturing the same.

BACKGROUND ART

Figure 11A:
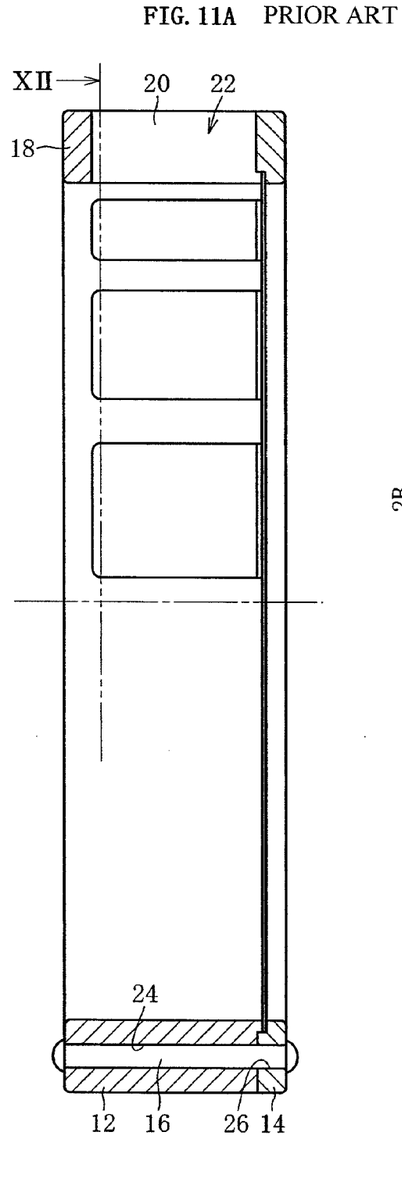
FIG. 11A is a vertical sectional view of a conventional split-type machined cage.
Figure 11B:
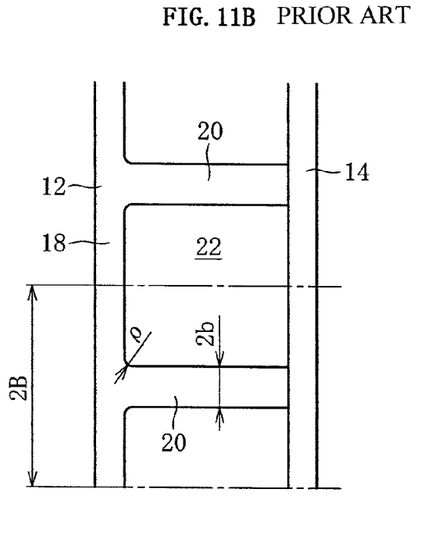
FIG. 11B is a plan view of the cage of FIG. 11A.
Figure 12:
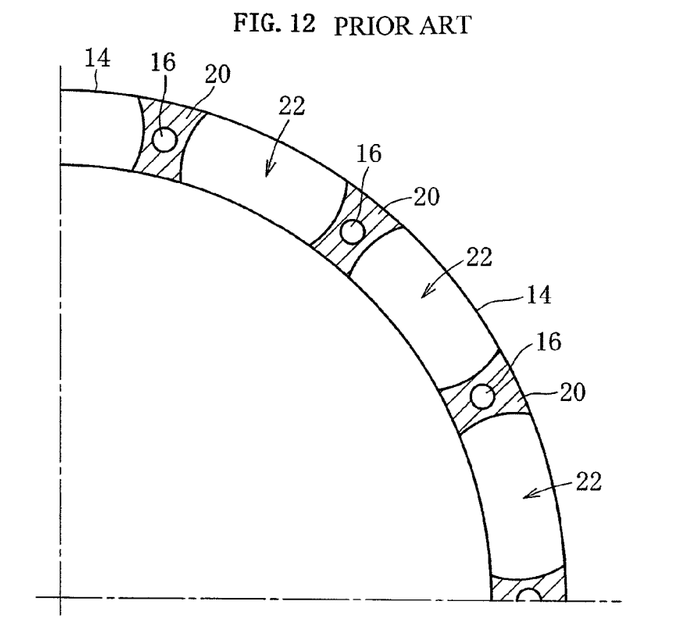
FIG. 12 is a view viewed in a direction of an arrow XII of FIG. 11A.

There are machined cages for a cylindrical roller bearing of an integral type or a split type. The machined cage of the split type should be called a two-bodied rivet-type machined cage. As shown in FIGS. 11A, 11B, and 12, a main body 12 and a side plate 14 are connected by rivets 16 (see paragraph 0002 and FIG. 14 of JP 2001-12477 A). The main body 12 is composed of a disk-like side plate portion 18 and a plurality of column portions 20 axially protruding from the side plate portion 18. Each of the column portions 20 has a rivet hole 24 passing therethrough in the axial direction of the main body 12. The side plate 14 has a disk shape as with the side plate portion 18 of the main body 12 and is provided with rivet holes 26 at the same intervals as the rivet holes 24 of the main body 18. The side plate 14 is caused to abut on a front end of the column portion 20 of the main body 18, the rivets 16 are inserted into the rivet holes 24 of the main body 18 and the rivet holes 26 of the side plate 14, and ends of those are swaged, thereby connecting the main body 12 and the side plate 14. The column portions 20 are arranged at equal intervals in the circumferential direction. Between the adjacent column portions 20, pockets 22 are defined. One of a pair of surfaces of wall surfaces defining the pocket 22, opposing each other in an axial direction is formed by the side plate portion 18 and the other of those is formed by the side plate 14. Further, a pair of surfaces of the wall surfaces defining the pocket 22, opposing each other in a circumferential direction is formed by the side surfaces of the column 20.

Figure 13A:
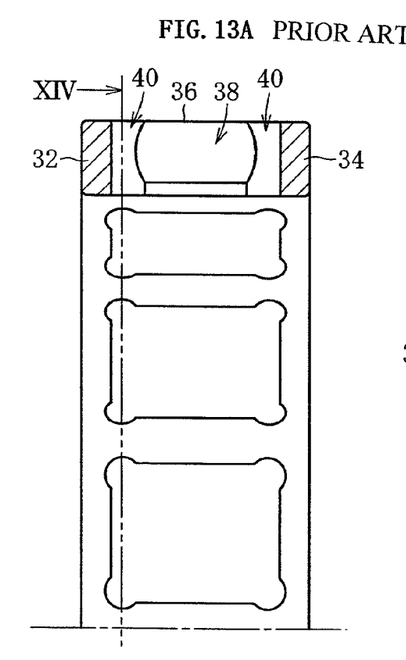
FIG. 13A is a vertical sectional view of a conventional integral machined cage.
Figure 13B:
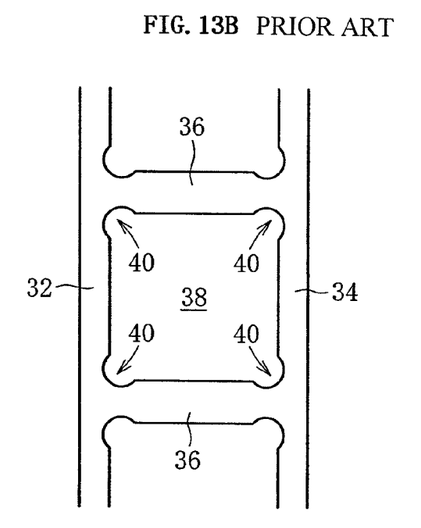
FIG. 13B is a plan view of the cage of FIG. 13A.
Figure 14:
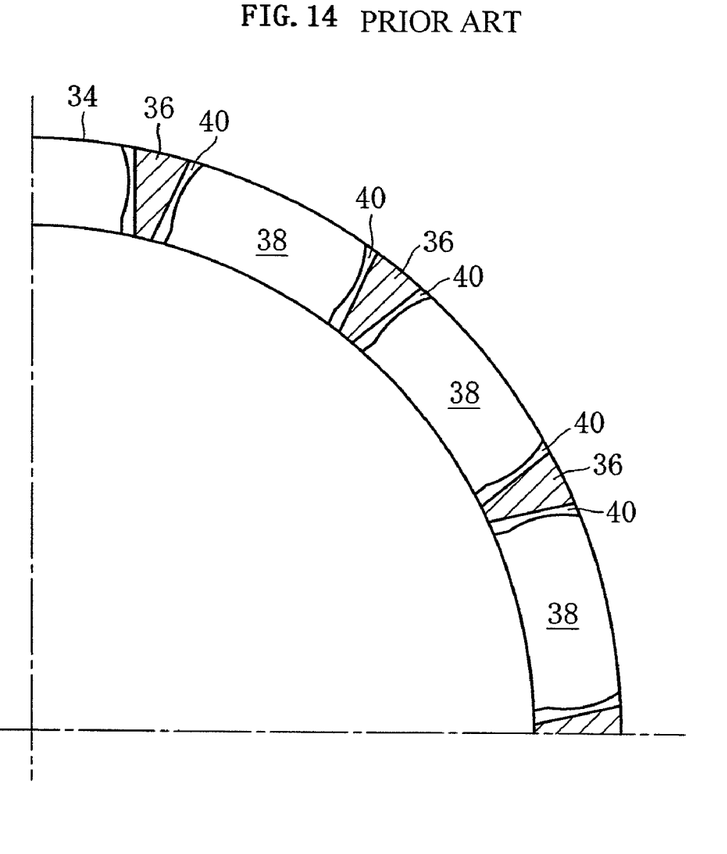
FIG. 14 is a view viewed in a direction of an arrow XIV of FIG. 13.

As shown in FIGS. 13A, 13B, and 14, in the integral machined cage, a square hole is cut in a ring-like material, thereby forming a pair of side plates 32 and 34 and a plurality of columns 36 and pockets 38 are defined between the adjacent columns 36 (see FIGS. 1 and 2 of JP 11-218135 A). Reliefs 40 are formed at four corners of each of the pockets 38. As understood from FIG. 14, side surfaces of the column 36 have circular arc sections. Note that, as described in JP 11-218135 A, even if a surface for guiding the cylindrical roller has a circular arc shape, there are some cases where the reliefs are not formed. A basic method of machining the pockets of the former cage is basically drilling and end mill machining, and that of the latter cage is a machining method disclosed in JP 2001-191214 A.

Further, there is also an integral cage disclosed in Japanese Utility Model Application Laid-open No. Hei 5-12753, in which the side surfaces of the pockets are in parallel to each other. The machining method in this case is assumed to be broaching considering that the reliefs are not formed at the four corners of each pocket.

Patent Document 1: JP 11-218135 A (FIGS. 1, 2, and 4)
Patent Document 2: JP 2001-12477 A (paragraph numbers 0002, 0031, and FIGS. 6, 8, and 14)
Patent Document 3: Japanese Utility Model Application Laid-open No. Hei 5-12753 (paragraph number 0010)

DISCLOSURE OF THE INVENTION

Problem to be Solved by the Invention

In a case of a split-type machined cage, the pockets 22 are formed by drilling in which a drill is moved in the axial direction of the cage. Accordingly, of wall surfaces defining the pocket 22, the side surfaces of the columns 20 forming the pair of surfaces opposing in the circumferential direction have circular arc cross section (section perpendicular to the axis of the cage) (FIG. 12). A radius of curvature ρ (FIG. 11B) of a connection portion between the side surface of the column 20 and the inner surface of the side plate portion 18 forming the pair of surfaces of the wall surfaces defining the pocket 22, opposing each other in the axial direction is required to be necessarily made smaller than a radius of curvature of the chamfer of the cylindrical roller so as not to interfere with the cylindrical roller to be used. For example, the radius of curvature of the chamfer of the cylindrical roller of Φ 28 times 28 used for the cylindrical roller bearing of NU 320 is 0.7 mm at the minimum. Therefore, the radius of curvature ρ of the connection portion between the side surface of the column 20 and the inner side surface of the side plate 14 has to be made smaller than 0.7 mm. Note that, an NU type is a type in which a roller is inserted from an inner diameter side, and an N type is a type in which a roller is inserted from an outer diameter side.

In this case, as to the strength of the column 20 of the cage, a factor of stress concentration (α) is generally adopted as an index of the stress concentration generated in the connecting portion between the side surface of the column 20 and the inner surface of the side plate 14. As commonly known, α can be determined by the following equation.

$$\alpha = 1 + \left\{ \tanh\left[\frac{\left(\frac{B}{b}-1\right)^{\frac{1}{4}}}{1-\frac{\rho}{2b}}\right]\right\} \left\{\frac{0.13 + 0.65\left(1-\frac{\rho}{2b}\right)^4}{\left(\frac{\rho}{2b}\right)^{\frac{1}{3}}}\right\} \quad \text{[Equation 1]}$$

Here, a symbol b represents a half of a width of the column, a symbol B represents a distance from a center of the column to a center of the pocket, and a symbol ρ represents the radius of curvature.

With regard to a rolling element guiding cage of the above-mentioned NU 320, when the number of the rollers is 14, 2B is equal to 35.05 and 2b is equal to 7.05, and in a case where the connecting portion is configured to be the maximum, when ρ is set to 0.7 mm, α is 2.20. Note that, those are values calculated based on PCD of the rollers.

Further, in the integral machined cage, the four corners of the pockets 38 are drilled from the outer diameter side, thereby forming the reliefs 40. The reliefs 40 are formed by drilling, so a form of each of those is a straight hole in parallel to a pocket center line extending toward the center of the cage. It is required that each of the reliefs 40 bites into the side of the column 36 beyond the side surface of the circular arc column 36. In this case, the strength of the column 36 is determined on the section passing through a portion having the minimum width, that is, the bottom of the reliefs 40 (FIG. 14). Therefore, as compared to the width dimension of the column in the above-mentioned split-type machined cage, the column in the integral machined cage has a smaller sectional area, and thus has less strength.

As described above, the conventional integral machined cage (with the reliefs each having the form of the straight hole) has a smaller sectional area at the bottom of the columns 36, thereby causing the strength of the columns to be reduced. In the conventional integral cage (one in which the column side surface has the circular arc shape and no relief is formed, and which is formed by a machining method disclosed in JP 2001-191214 A), as compared to a case where the sectional shape of the side surface of the column 36 is straight (one shown as a direction in Japanese Utility Model Application Laid-open No. 05-12753), the sectional area of each of the columns 36 is larger, so the strength of the columns increases, but the time for machining the side surface of the columns 36 becomes longer. Further, in machining of the surfaces of the wall surfaces defining the pocket 38, the surfaces opposing each other in the axial direction (pocket side surfaces), the surfaces of the relief portions 40 finished with an end mill and the portions other than those, that is, the connecting portions with the slotting surfaces finished with a forming tool do not coincide with each other, so steps are caused to a greater or lesser degree. The pocket side surfaces are brought into slide contact with end surfaces of the rollers. Thus, when the pocket side surfaces have steps, lubricating oil is scraped off from the roller end surfaces, thereby causing reduction in bearing life due to lubrication failure.

A main object of the present invention is to increase the strength of the machined cage for a cylindrical roller bearing without reducing the bearing life.

Means for Solving the Problem

According to the present invention, a machined cage for a cylindrical roller bearing is the machined cage of an integral type, including: a pair of side plates; a plurality of columns, which are arranged in a circumferential direction, for connecting the pair of side plates; pockets formed between the adjacent columns; and relief portions provided at four corners of each of the pockets, characterized in that on a section perpendicular to an axis of the cage, the columns have side surfaces each constituting a circular arc shape, and the relief portions are in parallel to the side surfaces of the columns.

In order to ensure the strength of the columns, it is important to increase a sectional area at the bottom of the columns and to mitigate stress concentration. On the section perpendicular to the axis of the cage (FIGS. 1B and 14), the relief portions are made in parallel to the side surfaces of the columns (FIG. 1B), thereby increasing the sectional area at the bottom of the columns as compared to the conventional art (FIG. 14) in which the reliefs are formed in parallel to the pocket center line. That is, the relief according to the conventional art (FIG. 14) does not have a sectional area which is constant in the thickness direction of the column and the sectional area thereof is the maximum at an inner peripheral surface and an outer peripheral surface of the column. On the other hand, in a case of the cage according to the present invention, the relief portions are in parallel to the side surfaces of the columns. Therefore, every section thereof has the same size in the thickness direction of the columns. Accordingly, a degree to which the sectional area at the bottom of the columns is reduced is suppressed to the minimum. Further, the area of the relief portion biting into the bottom of the column 46 is small, so the stress concentration is mitigated as compared to the conventional art.

The shape of the relief portion may be composed of a first straight portion connecting to the side surface of the column through an intermediation of an inclined surface forming an obtuse angle $\theta_1$, a second straight portion connecting to an inner wall surface of the side plate through an intermediation of an inclined surface forming an obtuse angle $\theta_2$, and a circular arc portion brought into contact with the first straight portion and the second straight portion. The angles $\theta_1$ and $\theta_2$ are respectively equal to or more than 135°. The relief portion, and the side surface of the column and the inner wall surface (side surface) of the side plate are connected to each other through the intermediation of the inclined surfaces, thereby making it possible to avoid a problem in that extreme step is caused in the connecting portion to scrape off an oil film. Further, also in the connection between the side surface and the relief portion, by providing a certain angle to a forming tool, it becomes possible to form the relief portion outward of the side surface with reliability, whereby making the pocket superior in appearance quality.

A radius of curvature R of the circular arc portion of the relief portion may be set larger than a radius of curvature r of the chamfer of the cylindrical roller and smaller than the factor of stress concentration of a split-type cage. For example, values $a_1$ and $a_2$ have a difference of 0.1 mm or more, and the radius of curvature R which can be formed here is in a range of 0.7 mm to 1.54 mm. From the above-mentioned equation, the factor of stress concentration $\alpha$ in this case is determined to be 2.17 to 1.55 which is more advantageous than the split-type cage.

According to the present invention, there is provided a method of manufacturing a machined cage for a cylindrical roller bearing, the machined cage being of an integral type including: a pair of side plates; a plurality of columns, which are arranged in a circumferential direction, for connecting the pair of side plates; pockets formed between the adjacent columns; and relief portions provided at four corners of each of the pockets, in which on a section perpendicular to an axis of the cage, the columns have side surfaces each constituting a circular arc shape, and the relief portions are in parallel to the side surfaces of the columns, the method being characterized by including: moving, after the pocket is cut, a tool having a blade edge having the same contour as the relief portions at the corners in an X axis direction and a Y axis direction so that a rake angle $\theta$ is constant in any position in a thickness direction of the cage; and rotating the cage about a center of the cage in synchronism with conveyance of the tool.

Specifically, the method of manufacturing the machined cage for a cylindrical roller bearing includes, for example, the following steps.
 a) To cut a cage blank by turning a ring-like material.
 b) To cut a square hole in a pocket position of the blank.
 c) To prod four corners of the square hole with a small-diameter end mill.
 d) To finish, with an end mill, surfaces of wall surfaces of the square hole, opposing each other in an axial direction.
 e) To finish, with a forming end mill, surfaces of the wall surfaces of the square hole, opposing each other in a circumferential direction.
 f) To slot the relief portions at four corners with a forming tool.

Effect of the Invention

According to the present invention, it is possible to manufacture a cage for a cylindrical roller bearing with a cage strength being increased without reducing a bearing life. That is, by making the relief portions at the four corners of the pocket of the conventional integral machined cage shown in FIGS. 13A, 13B, and 14 into a shape parallel to the side surfaces of the column, the stress concentration can be mitigated without extremely reducing a sectional area thereof at a bottom of the column.

DESCRIPTION OF REFERENCE NUMERALS 42, 44 side plate
46 column
48 pocket
50 relief portion
52 first straight portion
54 second straight portion
56 circular arc portion
58 cylindrical roller

BEST MODE FOR CARRYING OUT THE INVENTION

Hereinafter, an embodiment of the present invention will be described with reference to the drawings.

Figure 1A:
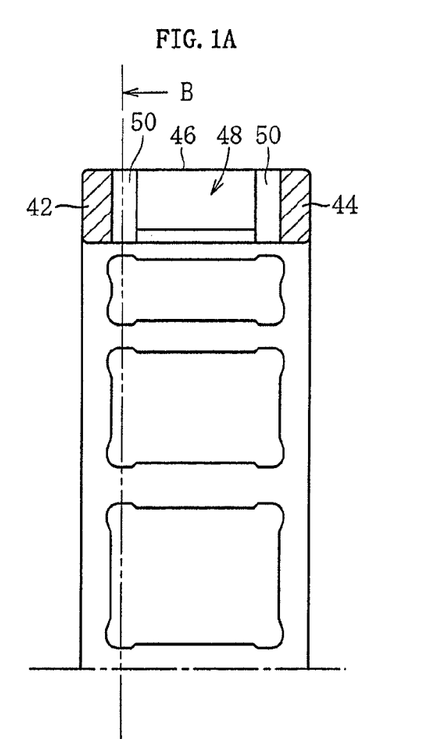
FIG. 1A is a vertical sectional view of a cage.
Figure 1B:
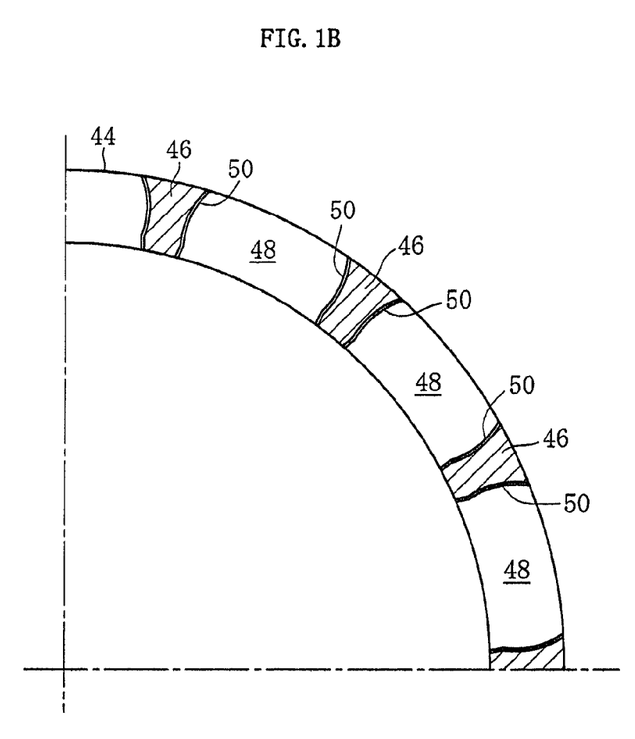
FIG. 1B is a side sectional view of the cage.
Figure 2:
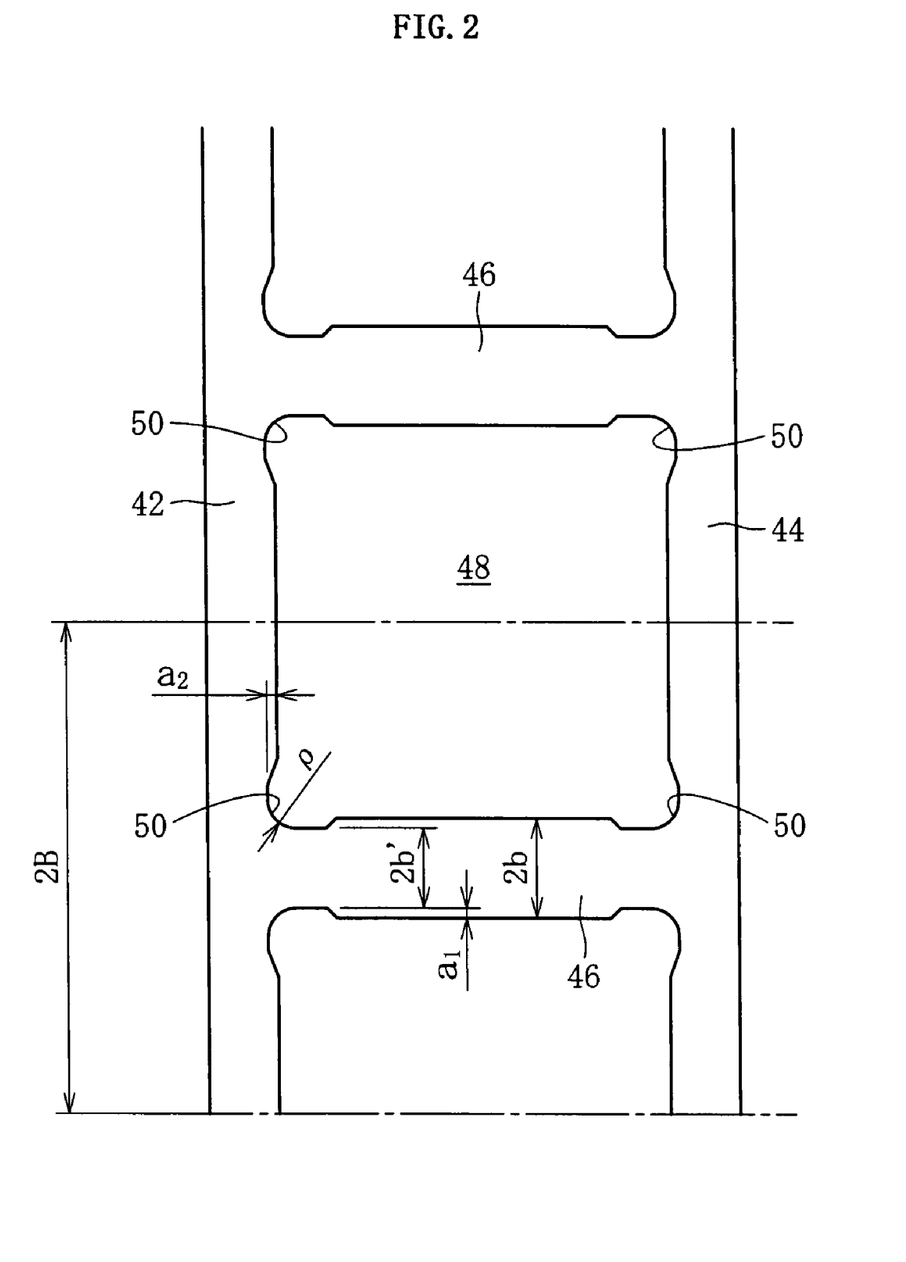
FIG. 2 is a plan view of the cage of FIG. 1A.

As shown in FIGS. 1A, 1B, and 2, an integral machined cage for a cylindrical roller bearing is formed of a pair of side plates 42 and 44, and a plurality of columns 46 connecting the pair of side plates 42 and 44, the columns 46 being arranged in a circumferential direction. Pockets 48 are formed between the adjacent columns 46. Relief portions 50 are formed at four corners of the rectangular pockets 48. Each of side surfaces of the columns 46 are formed in a circular arc shape on a section perpendicular to an axis of the cage (FIG. 1B). The relief portions 50 extend in parallel with the side surfaces of the columns 46.

In general, when a state is referred to as just a term, parallel, a relationship between a line and a line, a plane and a plane, or a line and a plane is referred thereby. However, there exists a mathematical term, parallel curves, so the term, parallel is also used with regard to curves in some cases. The parallel curves are defined as two curves having a common normal line at any point thereon. Parts of concentric circles belong to the parallel curves. The term "parallel" according to the description and the scope of claims is also used in this meaning. That is, since the relief portions are parallel to the side surfaces of the circular arc columns, each of the relief portions is also formed in a circular arc shape. In other words, on the section perpendicular to the axis of the cage, the side surfaces of the columns 46 and the relief portions 50 are formed in circular arc shapes which are coaxial and differ from each other in radius of curvature, and are in a relationship in which each of those constitutes a part of concentric circles.

Figure 3:
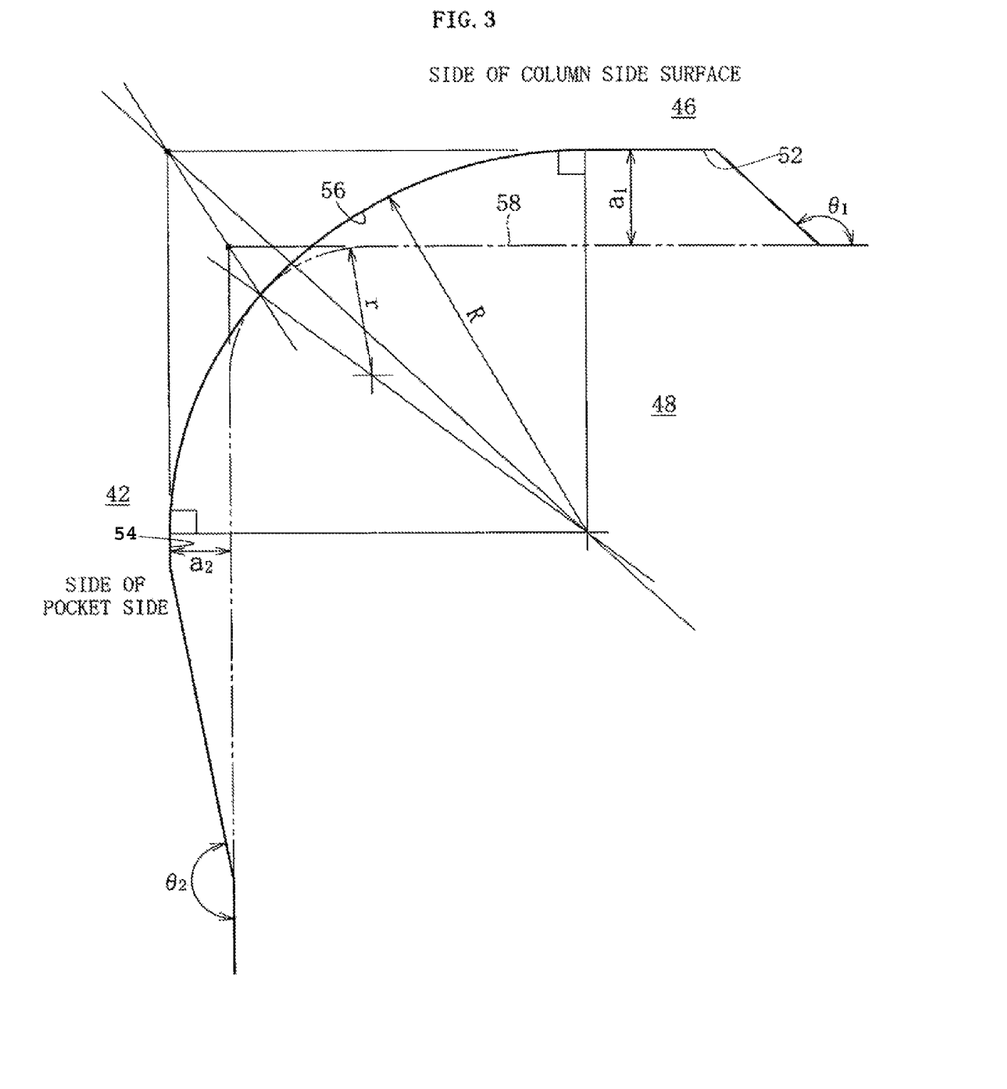
FIG. 3 is an enlarged view of a main portion of FIG. 2.

FIG. 3 shows the relief portion 50 in detail. The figure is an enlarged view of the relief portion on an upper left corner of the pocket 48 which appears in a center of FIG. 2. Note that, a chain double-dashed line shows a cylindrical roller 58. As shown in the figure, a contour of the relief portion 50 is formed of a first straight portion 52 connecting to the side surface of the column 46 at an inclined surface thereof forming an obtuse angle $\theta_1$, a second straight portion 54 connecting to an inner wall surface (side surface) of the side plate 42 at an inclined surface thereof forming an obtuse angle $\theta_2$, and a circular arc portion 56 connecting the first and second straight portions 52 and 54. The first straight portion 52 is offset toward an opposite pocket side by a dimension a1 in the circumferential direction from a side surface of the column 46. The second straight portion 54 is offset toward the opposite pocket side by a dimension a2 from an inner wall surface of the side plate 42. The second straight portion 54 is continuous with the inner wall surface, that is, the side surface of the side plate 42 through the inclined surface portion. Therefore, by providing a certain angle to a forming tool, it becomes possible to form the relief portion 50 outward of the side surface (opposite pocket side) with reliability. The first and second straight portions 52 and 54 constitute tangents with respect to the circular arc portion 56. An allowable range for the dimensions a1, a2, and R is a range in which a factor of stress concentration is smaller than that of a split-type machined cage and in which interference is not caused with respect to a chamfered portion of the cylindrical roller 58. Specifically, the radius of curvature R of the circular arc portion 56 is made larger than the minimum value (for example, min 0.7 mm in a case of a Ø 28 roller) of a radius of curvature r of the chamfered portion.

An outline of a cage manufacturing process is as follows. Ring machining→window rough machining (a square hole is drilled)→machining for four corners (four corners of the square hole is prodded with a small-diameter end mill)→side machining (surfaces opposing each other in the axial direction of the wall surfaces of the pockets are finished with an end mill)→pocket finishing machining (surfaces opposing each other in the circumferential direction of the wall surfaces of the pockets, that is, the side surfaces of the columns are finished with a forming end mill)→relief machining for right column two corners (top and bottom of right column side are slotted with the forming tool)→relief machining for left column two corners (top and bottom of left column side are slotted with the forming tool).

Figure 4:
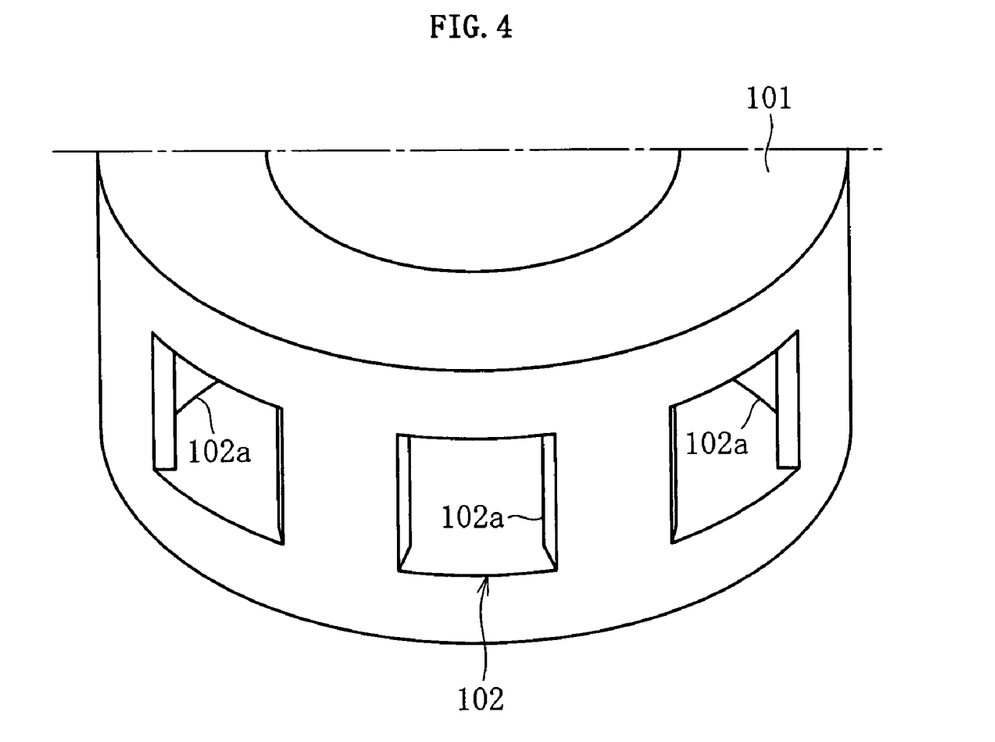
FIG. 4 is a perspective view of a work for illustrating a cutting method.
Figure 5:
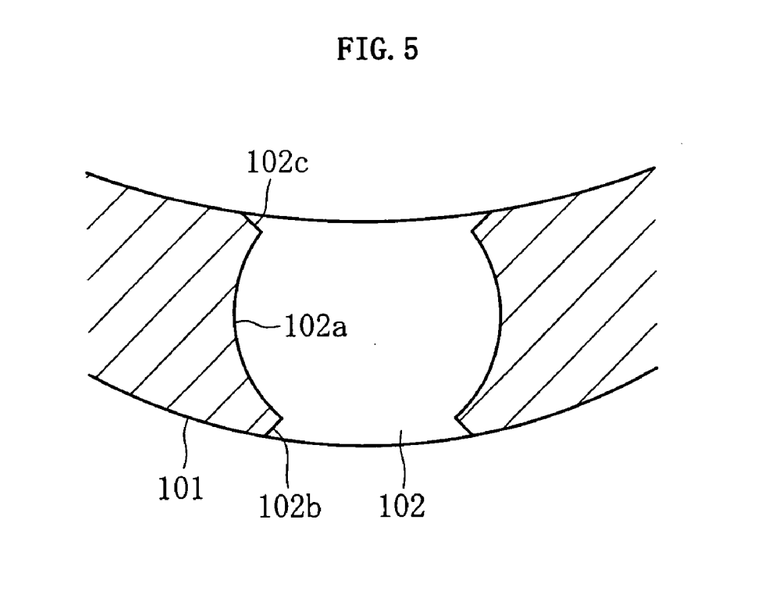
FIG. 5 is a sectional view of a main portion of the work of FIG. 4.

Next, a specific cutting method for the pockets including the relief portions 50 will be described. As shown in FIG. 4, a work 101 is formed in a cylindrical shape. In a peripheral portion thereof, there are formed a plurality of square holes 102 of a substantially foursquare shape having a circular arc concave surface 102a with both side surfaces thereof extending along a radial direction of the work 101, the square holes 102 being arranged at constant angular intervals. To be specific, as shown in FIG. 5 as a sectional view, the square hole 102 has, on one side surface thereof, a shape having an outer chamfered portion 102b positioned outside the work 101, the circular arc concave surface 102a continuous therewith toward the inner diameter side of the work 101, and an inner chamfered portion 102c further continuous with an inner end portion of the circular arc concave surface 102a, the outer chamfered portion, the circular arc concave surface, and the inner chamfered portion being symmetrically arranged also in the other surface thereof to form the square hole.

Figure 6:
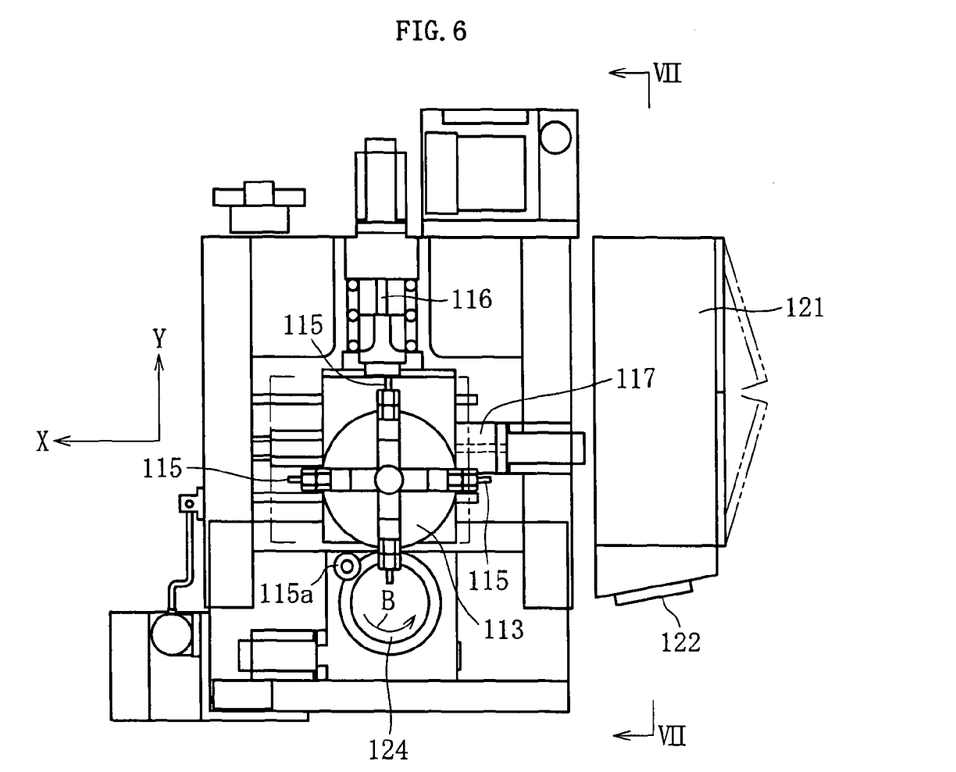
FIG. 6 is a plan view of a cutting device.
Figure 7:
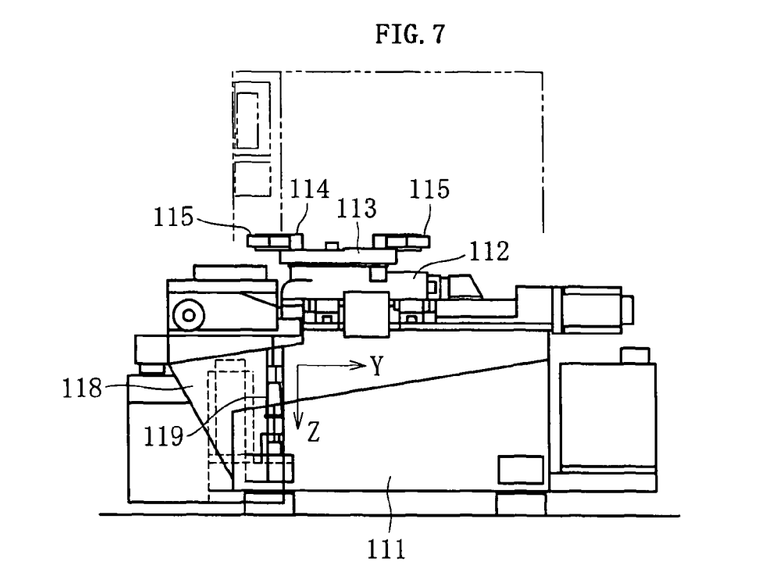
FIG. 7 is a side view of the cutting device.
Figure 8:
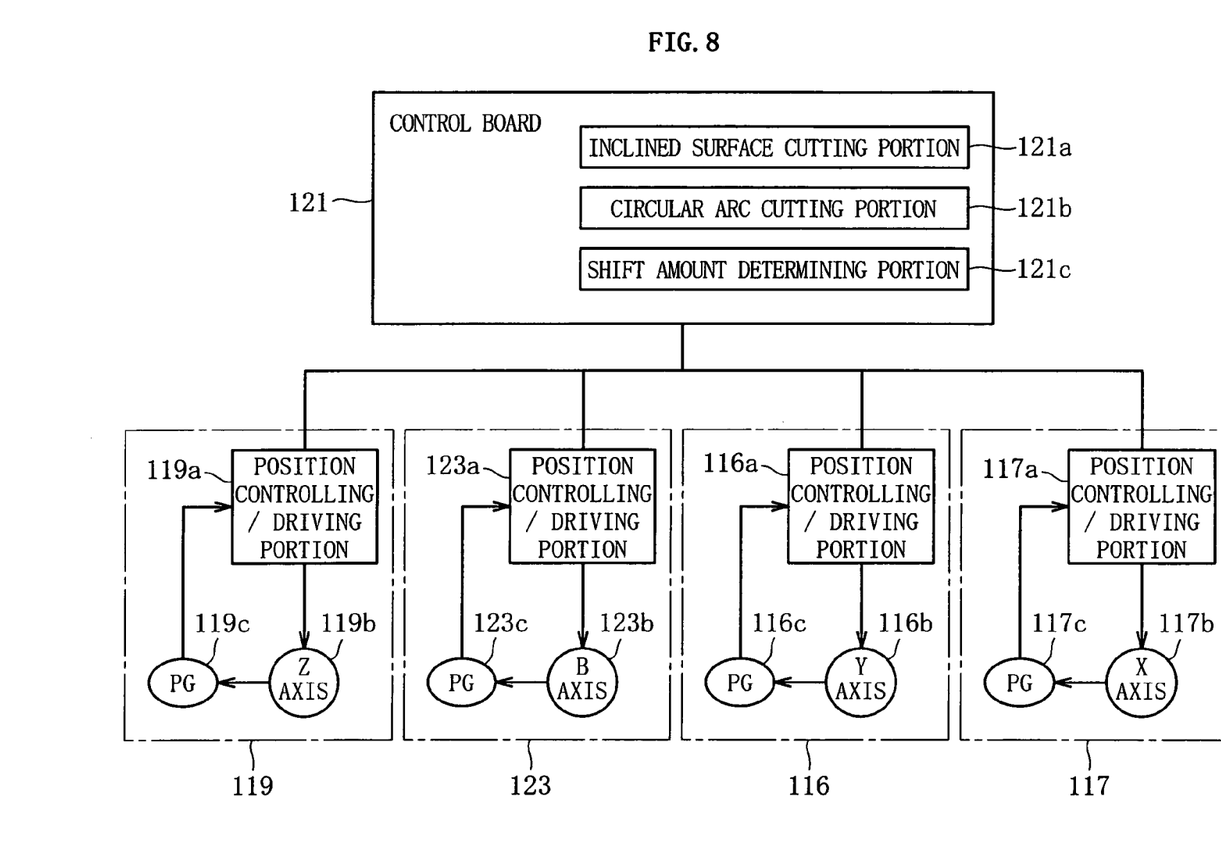
FIG. 8 is a block line drawing showing relationships between a control board and driving systems.

A square hole cutting device includes, as shown in FIGS. 6 to 8, an X-Y axes table 112, a rotary dividing table 113, a tool holder 114, a Y axis driving system 116, an X axis driving system 117, an NC table mechanism, and a control board 121.

The X-Y axes table 112 is attached onto a bed 111. The rotary dividing table 113 is rotatably attached onto the X-Y axes table 112. Tools 115 which are cutting tools are mounted on the rotary dividing table 113 through an intermediation of the tool holder 114. Here, four tools 115 are shown. That is, the tool for cutting the left side surface of the square hole 102, the tool, which is arranged in a position symmetric with respect to the tool for the left side surface, for cutting the right side surface, the tool for chamfering, and the spare tool. As shown in FIG. 6, those tools 115 are arranged on the rotary dividing table 113 at intervals of 90 degrees, and is structured to be movable in the radial direction due to the X-Y axes table 112. The X-Y axes table 112 is moved in the Y axis direction on the bed 111 by the Y axis driving system 116, and is moved in the X axis direction by the X axis driving system 117. In this manner, the tools 115 are moved on the same plane in the X axis direction and the Y axis direction through the intermediation of the rotary dividing table 113. Anterior of moving directions of the tools 115, there is provided a blade edge detector 115a for detecting a moving amount of a tool blade edge. Further, a Z axis saddle 118 is attached to a front portion of the bed 111. A Z axis driving system 119 is provided on the Z axis saddle 118.

The NC table mechanism is provided anterior of movement of the tool 115 in the Y axis direction, and is composed of an NC table 124 having the work 101 and an NC driving system 123 for rotating the NC table 124 about the axis in a B direction (see FIG. 8). Further, on a side portion of the bed 111, there is provided the control board 121 having an operation board 122 for inputting data required for an NC program. By performing the required data input through the operation board 122, operations of controlling the Y axis driving system 116, the X axis driving system 117, the Z axis driving system 119, the NC driving system 123, and the tools 115, respectively, are performed. As shown in FIG. 8, the X axis driving system 117 includes, although not shown in detail in FIGS. 6 and 7, a position controlling/driving portion 117a, an X axis servo motor 117b driven thereby, and a rotary encoder 117c for detecting a rotation angle of the X axis servo motor 117b and feeding back the rotation angle to the position controlling/driving portion 117a. Note that, in FIG. 8, the Y axis driving system 116, the Z axis driving system 119, the driving system 123 for the NC table 124 have the same construction as that of the X axis driving system 117. Therefore, here, the description thereof is omitted. The driving system 123 for the NC table is shown as a B axis 123b as a driving system in the rotation direction.

Figure 9:
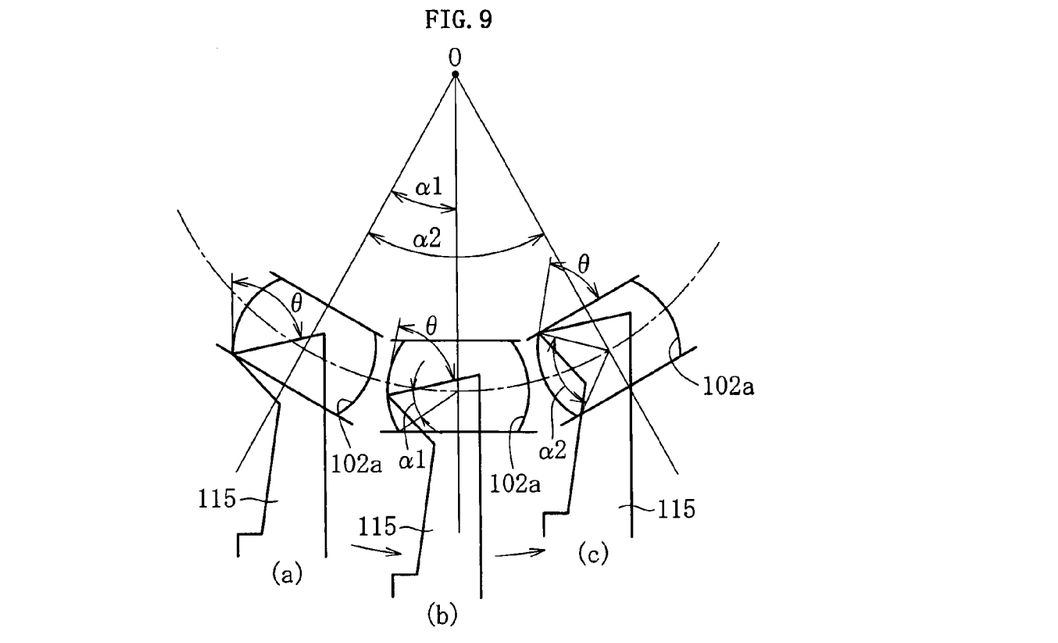
FIG. 9 is a line drawing showing a principle of cutting circular arc concave surfaces.
Figure 10A:
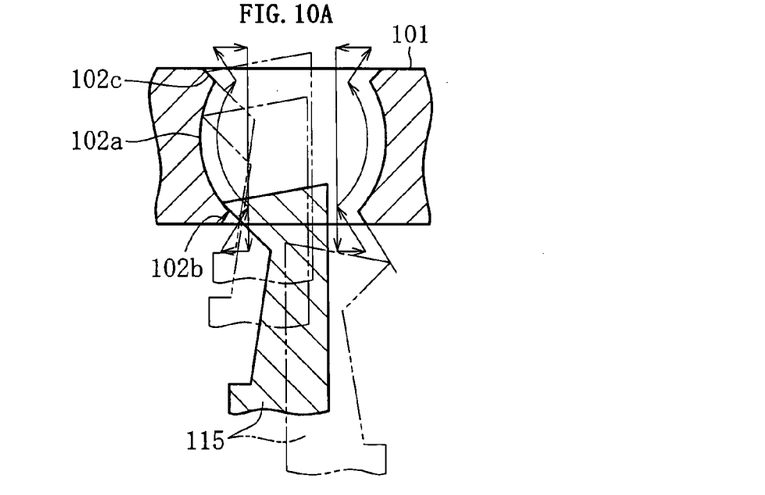
FIG. 10A is a sectional view illustrating a principle of cutting the circular arc concave surfaces and chamfers.
Figure 10B:
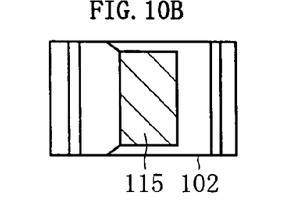
FIG. 10B is a bottom view illustrating a principle of cutting the circular arc concave surfaces and the chamfers.

The control board 121 controls the moving amount of the tools 115 and the rotation angle of the work 101 in a state where a rake angle formed by a cutting blade of the tool 115 and the circular arc concave surface 102a to be formed in each of both sides of the square hole 102 is kept constant when the square hole is formed in the work 101 with the tools 115, thereby making it possible to cut the circular arc concave surface 102a. That is, at the time of machining by the tools 115, the control board 121 sets an angle of the tool 115 with respect to the work 101 which is set in the NC table 124 such that, as shown in a position (a) of FIG. 9, the rake angle formed by the outer end portion of the circular arc concave surface 102a to be formed and the blade edge of the tool 115 becomes θ, and while keeping the angle constant, the control board 121 causes the tool 115 to move further forward as shown in positions (b) and (c) in the figure. At this time, in synchronism with the forward movement of the tool 115, the work 101 is gradually rotated about a center O of the NC table 124, thereby making it possible to cutting the circular arc concave surface 102a along a peripheral side portion of the work 101 and from an outer peripheral side to an inner peripheral side of the work. In this case, when the circular arc concave surface 102a on one side surface of the square hole 102 is formed, the circular arc concave surface 102a on the surface opposite to that circular arc concave surface 102a is also cut in the same manner by the tool 115 arranged in a symmetric position, thereby forming the square hole 102. Thus, the tools 115 moves on traces shown by arrows of FIG. 10 with respect to both sides of the square hole 102 of the work 101. Note that, in FIG. 10, a relative angular displacement of the tools 115 and the work 101 is omitted. Here, in the square hole 102 of the work 101, it is required to provide an outer chamfer 102b and an inner chamfer 102c on the outer end portion and the inner end portion of the circular arc concave surface 102a, respectively. Therefore, the outer chamfer 102b and the inner chamfer 102c are also cut by the chamfering tool (not denoted by reference symbol) in the same manner.

Thus, the control board 121 includes an inclined surface cutting portion 121a for controlling movement of the chamfering tool and controlling the rotation angle of the work 101 in synchronism with the movement amount at the time of machining of the work 101 in a state where the rake angle θ formed by the chamfering tool, and the outer chamfer 102b and the inner chamfer 102c of the square hole 102 to be formed of the work 101 is kept constant, and a circular arc cutting portion 121b for controlling movement of the tools 115 and controlling the rotation angle of the work 101 in synchronism with the movement amount in a state where the rake angle θ formed by the tool 115 and the circular arc concave surface 102a of the square hole 102 to be formed is kept constant. According to commands from the inclined surface cutting portion 121a and the circular arc cutting portion 121b, the X axis driving system 117, the Y axis driving system 116, and the driving system 123 for the NC table 124 are respectively controlled, thereby making it possible to cut and form the outer chamfers 102b, the circular arc concave surfaces 102a, and the inner chamfers 102c on both sides of the square hole.

Accordingly, the square hole cutting device includes the X axis driving system 117 for moving the tools in the X axis direction with the aid of the rotary dividing table 113 on which the tools for the circular arc concave surfaces and the chamfering tools are respectively mounted through the intermediation of the tool holder 114, the NC table 124 having the work 101, the driving system 123 for rotating the work 101 with the aid of the NC table 124, and the control board 121 for controlling the rotary dividing table 113, the Y axis driving system 116, the X axis driving system 117, and the driving system 123 for the NC table 124. Note that, in FIG. 8, a shift amount determining portion is denoted by reference symbol 121c and will be described later as with the Z axis driving system 119.

Next, an operation of the square hole cutting device having the above-mentioned structure will be described. In the square hole cutting device, the work 101 is set on the NC table 124. The tools 115 required for machining are mounted on the tool holder 114. The tool 115 for machining a portion to be machined of the work 101 is positioned correspondingly to the portion. Then, the square hole cutting device is turned on for cutting the square holes 102 each having the chamfers 102b and 102c and the circular arc concave surfaces 102a on the side surfaces thereof in the work 101. The Y axis driving system 116 and the X axis driving system 117 are driven and the NC driving system 123 for the NC table 124 is also driven. Then, the chamfering tool (not denoted by reference symbol) first performs slotting operation, the work 101 rotates together therewith, thereby cutting the chamfer 102b. At this time, in the state where the rake angle formed by the blade edge of the chamfering tool and the outer chamfer 102b of the square hole 102 to be formed of the work 101 is kept constant, the movement of the chamfering tool 115 is controlled, and in synchronism with the movement amount thereof, the rotation angle of the NC table 124 is controlled, thereby cutting the outer chamfer 102b.

Next, after the outer chamfer 102b is formed, the tool 115 for forming the circular arc concave surface 102a is positioned in a predetermined position in place of the chamfering tool on the tool holder 114, thereby starting cutting of the circular arc concave surface 102a. In this case, in a state where the rake angle $\theta$ formed by the blade edge of the tool 115 and the circular arc concave surface 102a of the square hole 102 to be formed is kept constant, the movement of the tool 115 is controlled, and in synchronism with the movement amount thereof, the rotation angle of the NC table 124 is controlled, thereby gradually defining the circular arc concave surface 102a of the square hole 102 from the outer peripheral side of the work 101 to the inner peripheral side thereof. Thus, by defining the circular arc concave surface 102a continuously to the inner peripheral side, whereby the circular arc concave surface 102a is cut. After cutting of the circular arc surface 102a, positioning of the chamfering tool on the tool holder 114 is performed again, and the driving systems are driven in the same manner as described above, thereby cutting the inner chamfer 102c on the inner peripheral side of the circular arc concave surface 102a and ending machining on one side surface of the square hole 102. After that, the driving systems are driven in the same manner as described above, thereby ending cutting of the square hole 102 having the outer chamfers 102b, the circular arc concave surfaces 102a, and the inner chamfers 102c on both side surfaces thereof.

As described above, in the state where the rake angle $\theta$ formed by the blade edge of the tool 115 and the circular arc concave surface 102a of the square hole 102 to be formed is kept constant, the movement of the tool 115 is controlled, and in synchronism with the movement amount thereof, the rotation angle of the NC table 124 is controlled, thereby making it possible to cut the circular arc concave surface 102a.

The relief portions of the cage shown in FIGS. 1A, 1B, and 2 can be cut by moving the forming tool having a contour of the relief portion shown in FIG. 3 in the same manner as in a case of cutting the circular arc concave surface 102a. Specifically, the control board 121 includes the inclined surface cutting portion 121a for controlling the movement of the forming tool and controlling the rotation angle of the work 101 in synchronism with the movement amount thereof at the time of machining of the work 101, in a state where the rake angle $\theta$ formed by the forming tool and the relief portion to be formed of the work 101 is kept constant, and the circular arc cutting portion 121b for controlling the movement of the tool and controlling the rotation angle of the work 101 in synchronism with the movement amount thereof in a state where the rake angle $\theta$ formed by the tool and the relief portion is kept constant. According to commands from the inclined surface cutting portion 121a and the circular arc cutting potion 121b, the X axis driving system 117, the Y axis driving system 116, and the NC table mechanism are respectively controlled, thereby making it possible to cut the relief portion at each of the four corners of the square hole 102.

Note that, the integral machined cage for a cylindrical roller bearing according to the present invention is not limited to the above-mentioned embodiment. Various modifications may be added within a range not departing from the gist of the present invention.

The invention claimed is:

1. An integral machined cage for a cylindrical roller bearing, comprising:
    a pair of side plates;
    a plurality of columns, arranged circumferentially, integral with and connecting the pair of side plates;
    pockets formed between adjacent pairs of said columns, respectively; and
    relief portions provided at four corners, respectively, of each of the pockets,
    wherein on a section view perpendicular to an axis of the cage, the columns have side surfaces each having a circular arc shape, and the relief portions each have a circular arc shape in parallel to the circular arc shaped side surfaces of the respective pair of columns,
    wherein each of the relief portions comprises: a first straight portion connected to one of the side surfaces of one of the columns via an inclined surface forming an obtuse angle with respect to the one of the side surfaces; a second straight portion connected to an inner wall surface of one of the side plates via an inclined surface forming an obtuse angle with respect to the inner wall surface; and a circular arc portion connected to the first straight portion and the second straight portion.

2. A roller bearing assembly, comprising:
    a cylindrical roller having a chamfer; and
    an integral machined cage including a pair of side plates, a plurality of columns, arranged circumferentially, integral with and connecting the pair of side plates, pockets formed between adjacent pairs of said columns, respectively, and relief portions provided at four corners, respectively, of each of the pockets,
    wherein on a section view perpendicular to an axis of the cage, the columns have side surfaces each having a circular arc shape, and the relief portions each have a circular arc shape in parallel to the circular arc shaped side surfaces of the respective pair of columns,
    wherein each of the relief portions comprises: a first straight portion connected to one of the side surfaces of one of the columns via an inclined surface forming an obtuse angle with respect to the one of the side surfaces; a second straight portion connected to an inner wall surface of one of the side plates via an inclined surface forming an obtuse angle with respect to the inner wall surface; and a circular arc portion connected to the first straight portion and the second straight portion, and
    wherein the circular arc portion of the relief portion has a radius of curvature larger than a radius of curvature of the chamfer of the cylindrical roller and smaller than a radius that causes a predetermined stress concentration.

* * * * *